Jan. 23, 1968 A. ZIMMERMAN 3,365,661

METHOD AND APPARATUS FOR LOCATING LEAKS IN A CABLE BY DETERMINING THE DISTANCE TO A SHORT CIRCUIT IN THE CABLE

Filed April 26, 1965

INVENTOR.
ARIE ZIMMERMAN

BY

Pennie, Edmonds, Morton, Taylor & Adams
ATTORNEYS 3,365,661

METHOD AND APPARATUS FOR LOCATING LEAKS IN A CABLE BY DETERMINING THE DISTANCE TO A SHORT CIRCUIT IN THE CABLE

Arie Zimmerman, Malta, Ill., assignor to Anaconda Wire and Cable Company, New York, N.Y., a corporation of Delaware Filed Apr. 26, 1965, Ser. No. 450,636
5 Claims. (Cl. 324—52)

Figure 4:
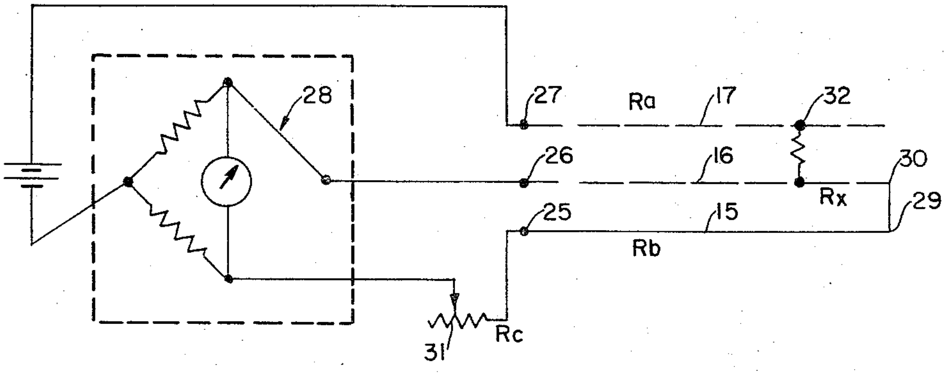

This invention relates to detection and location of faults in communication cables, such as telephone cables, caused by leaks in their outer jackets. More particularly, it relates to a method and an apparatus for locating water or other conductive materials within the communication cable.

In the typical telephone cable, an outer protective jacket encloses a multiplicity of conductor pairs which may each carry a separate telephone circuit. These conductors are usually individually insulated with a non-porous thermoplastic dielectric material, such as polyethylene. It sometimes happens that the jacket in such a telephone cable develops a leak through which water gains access to the conductor pairs therewithin. The water can then cause a short circuit in one or more of the conductor pairs by seeping through one of the occasional small pinholes which are practically unavoidable in the conductor insulation. Even if the water does not directly short out one of the conductor pairs in this manner, it can disrupt service simply by enveloping a short length of one or more of the pairs and increasing its mutual capacitance to the point where the voice signal is lost.

It has been found, however, that with the use of the newer nonporous thermoplastic dielectric material as individual insulation on the conductor pairs even more serious problems are created when a leak occurs. The water often travels a considerable distance through the cable from the point of the leak before it encounters a defect in the nonporous insulation and causes a short circuit or sufficiently envelops one of the conductor pairs to critically attenuate its voice signal. As a result, when a disruption in service occurs from the wetting of conductor pairs insulated with these nonporous synthetic dielectric materials, it is very difficult to determine where the leak has occurred since the water may have traveled for hundreds of feet through the cable from the point of the leak. Also, when the leak is found, the extended length of the cable, which is wetted, must be replaced or reconditioned.

U.S. Patent No. 3,098,116, assigned to Anaconda Wire and Cable Company, discloses means for detecting the entrance of water into a telephone cable which comprises a pair of insulated wires having on their insulation coatings a plurality of closely spaced openings throughout the entire length of the wires baring the conductive elements therewithin. This pair of perforated wires is positioned within the telephone cables longitudinally similar to other pairs of telephone wires in the cable. By impressing a voltage on the perforated wires, water entering into the telephone cable through a fault will be detected immediately when it wets the exposed conductors and causes a short circuit. While this leak detecting telephone cable is capable of detecting the leakage in the cable, it fails to indicate the exact location of the leak. Its usefulness, therefore, is limited for telephone cables of substantial length because locating the precise place where the leakage occurred in a lengthy cable would prove to be time consuming.

It is the purpose of this invention to provide a simple and efficient method capable of detecting the leakage and simultaneously indicating the location of the fault. Broadly stated, the method of this invention for locating a fault in a defective communication cable comprises incorporating into a cable a first insulated electrical conductor extending longitudinally therein, and a second and a third electrical conductor substantially parallel to the first conductor. The second and third conductors normally are insulated from each other and are capable of being short-circuited at a plurality of points along the length of the cable by water and other conductive materials entering into the defective cable. One terminal of the first electrical conductor is connected to one terminal of the second conductor, and the electrical resistance of the second conductor is measured from between the point where the short circuit occurred to the terminal connection. The location where a short circuit occurred is then determined by relating the value of the resistance to the specific resistivity of the second conductor.

Advantageously, the method is carried out with an apparatus which comprises three electrical conductors extending longitudinally in the cable. The first of these conductors is insulated by a nonporous plastic dielectric material, and the second and third conductors are insulated from each other by nonporous dielectric material coated thereon which forms a layer of insulation on the respective conductors. The insulation layers on the second and third conductors have small openings substantially equally spaced along the length of the cable through which a portion of the conductor surface is exposed. The second and third conductors are capable of being short-circuited through the openings of their insulations by water and other conductive materials entering into the defective cable. The terminal of the first conductor is connected to the terminal of the second conductor. Means are provided for measuring the resistance of a second conductor from between the point where the short circuit occurred to the terminal connection, and also means are provided for locating where a short circuit occurred by relating the resistance to the specific resistivity of the second conductor.

Figures 1, 2, 3:
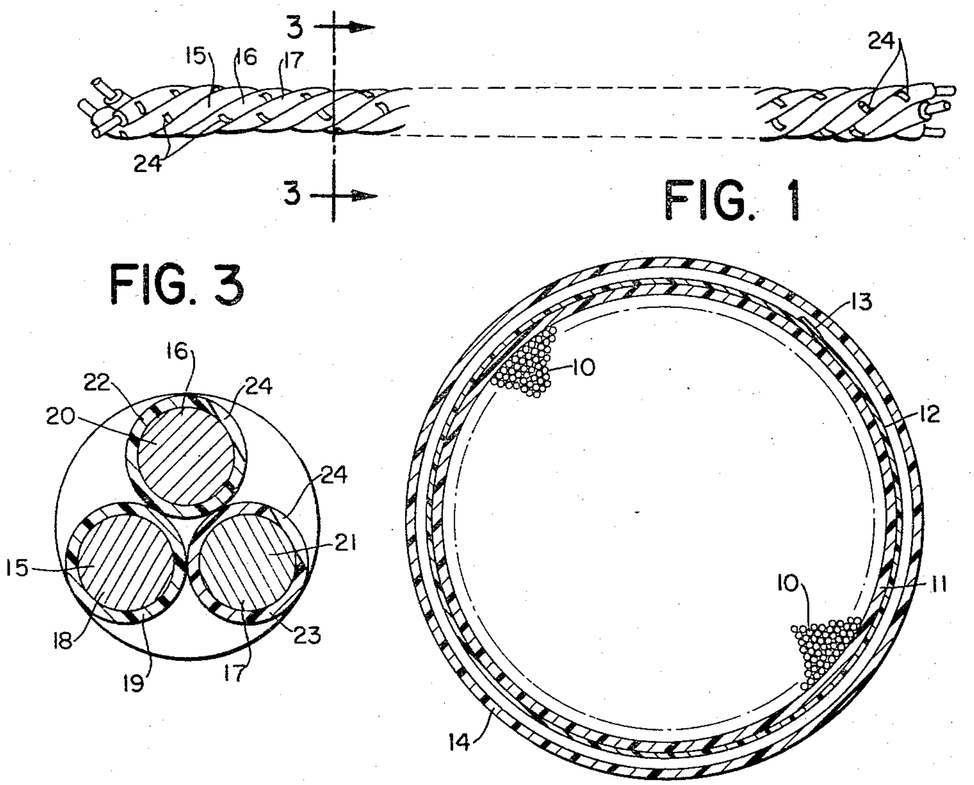

The electrical resistance of the second conductor from between the point where the short circuit occurred to the terminal connection can be measured conveniently by a conventional electrical bridge, such as a Wheatstone bridge. Once the resistance is determined, the location of the fault can be accurately determined by converting this resistance to distance using the specific resistivity of the conductor under normal operating conditions. Further to illustrate this invention a specific example is described hereinbelow with reference to the accompanying drawings wherein:

FIG. 1 is a cross section taken through a telephone cable of the type in which the new detector and fault locating electrical circuit is to be incorporated, FIG. 2 is an enlarged view of a length of twisted triad of the detector conductors of the invention, FIG. 3 is a section taken along the line 3—3 of FIG. 2, and FIG. 4 is a schematic drawing of a modified Wheatstone bridge connected to the triad according to the invention for locating the fault in the communication cable.

Referring initially to FIG. 1, a telephone cable is shown which includes an inner core assembly made up primarily of a multiplicity of conductor pairs 10, each of which may form a separate circuit. Wrapped about the conductor pairs 10 is a suitable protective tape 11 and surrounding the tape, throughout the length of the cable, is an aluminum shield 12 which may be an extended thin aluminum strip applied longitudinally with its edges overlapping at 13. In relatively large diameter telephone cables, the aluminum shield 12 may be corrugated as shown. Surrounding the outside of the shield 12 is a continuous extruded protective jacket 14 of suitable moisture resistant material, such as polyethylene.

A thin normally continuous layer of synthetic polymeric material, such as polyethylene, covers each of the conductors of the pairs 10 and electrically insulates them from one another. For purposes of identification, these coverings are often of different colors and the conductors 10 are often wrapped in separate groups and subgroups. As many as possible of the conductors 10 are usually included within the cable.

As stated previously, occasional defects, such as pinholes, in the insulation of conductors 10 cannot be avoided so the jacket 14 is provided to prevent water and other harmful substances from entering into the cable and short circuiting the conductor pairs. In the event that a leak does occur in the jacket 14 and in the absence of any form of leak detecting means, the water which enters can work its way from hundreds of feet in either direction from the point of the leak before it encounters a defect in one of the conductor pairs 10 and causes a short circuit or otherwise effects a loss of voice signal.

To detect and to locate the leak in accordance with the invention, three twisted detector wires 15, 16, and 17, as shown in FIG. 2 and FIG. 3, are used. The wire 15 consists of an electrical conductor 18 insulated by a nonporous plastic dielectric material 19 to form a detector wire similar to conventional insulated telephone wires. Detector wires 16 and 17 are made up of electrical conductors 20 and 21, respectively, which are surrounded by insulating layers 22 and 23 of a plastic dielectric material, such as polyethylene. Each of the detector wires 16 and 17 has a plurality of small openings 24 formed in its respective layer of insulation 22 and 23. These openings are closely spaced along the entire length of the detector wires 16 and 17 and expose the electrical conductors 16 and 17 therewithin. As is shown in FIG. 3, the openings 24 are advantageously transversely displaced or removed portions of the layers of insulation 22 and 23 which can be formed with the apparatus described in the copending application Ser. No. 237,779, filed on Oct. 12, 1962, now Patent No. 3,244,043, and assigned to the common assignee of this invention.

At least one of these triads is enclosed within the cable along with all of the conductor pairs 10. Preferably, the triads are made of insulated wires substantially of the same size and shape and are twisted in the same manner as the conductor pairs 10, but differ therefrom in that detector wires 16 and 17 have perforated insulation throughout their entire length as described hereinabove. The number of triads incorporated into the cable depends primarily upon the size of the cable since with larger telephone cables a greater number of triads may be installed.

In this specific example, one triad was incorporated into a telephone cable which has the physical dimensions listed in Table 1 and the electrical properties listed in Table 2.

TABLE I.—PHYSICAL DIMENSIONS

| | | |
|---|---|---|
| Length of cable | ft | 1,033 |
| Over-all diameter of cable | in | .0454 |
| Diameter over shield | in | .685 |
| Width of shield | in | 2.25 |
| Thickness of GRS tape | in | 0.015 |
| Corrugations of shield | per in | 9 |
| Avg. DOD of 19 AWG pairs | mil | 58.6 |
| Avg. DOD of 22 AWG pairs | mil | 42.0 |
| Avg. diameter of bare conductors—19 AWG | mil | 36.1 |
| Avg. diameter of bare conductors—22 AWG | mil | 24.6 |
| Avg. distance between break in insulation on the "Tell Tale Pair" | in | ½ |

TABLE II.—ELECTRICAL DATA

| | 25 Pair 19 AWG | | 1 Pair 22 AWG |
|---|---|---|---|
| | Arithmetic Mean | RMS | |
| $R_{DC}$ (DC Resistance)[1] | [1] 16.42 | | [1] 34.88 |
| $R_{UB}$ (Resistance Unbalance) | [1] 0.0148 | [1] 0.022 | [1] .37 |
| Pair-to-Pair | | [2] 9.2 | [2] 16 |
| $C_{UB}$ (Capacitance Unbalance): Pair-to-Shield.[2] | [2] 40 | [2] 25 | [2] 0.1 |

[1] Ohm/ length.
[2] Picofarad/length.

The triad consists of a polyethylene insulated 19 AWG conductor 15 and a pair of perforated polyethylene covered 22 AWG conductors 16 and 17. The perforations on the polyethylene layers are equally spaced about one-half inch apart. The three detector wires 15, 16, and 17 were connected, respectively, to terminals 25, 26, and 27 of a modified Wheatstone bridge 28 as shown in FIG. 4. To complete the detector circuit, wires 15 and 16 were electrically connected at point 29 about 924 feet away from terminals 25 and 26.

The cable containing this detection circuit was then used to locate water in the cable. Before its use, the cable was completely dried by exposing it to heated and moisture-free air for 12 hours. The air used was conditioned by first passing it through a Dry Ice moisture trap and then through a heated 4-foot cylinder filled with anhydrous calcium chloride, and it was considered to be dry when it failed to cause a reaction in a 10 ml. cylinder containing a Karl Fisher reagent (Karl Fisher reagent changes its color from red to yellow when it is exposed to an amount of water greater than 0.01% of its volume).

Under normal operating conditions, voltages are impressed between terminals 25 and 27 and terminals 26 and 27. The variable resistor 31 is adjusted so that the Wheatstone bridge is normally out of the balance range. When a leak occurs in the jacket 14, water or other conductive materials enter into the cable and cause a short circuit as a high resistance path between detector wires 16 and 17 at point 32. The short energizes the modified Wheatstone bridge 28 to actuate an alarm or other warning devices to signal the leakage. The variable resistor 31 is then adjusted to balance the bridge 28. When it is balanced, the modified Wheatstone bridge 28 will indicate that the resistance corresponding to the length of the conductor 17 from terminal 27 to 32 is equal to the resistance corresponding to the total length of conductor 15 plus the length of conductor 16 from point 32 to point 29. This relation can be represented by the following equations:

$$R_a - R_x = \pm R_c + R_b + R_x \quad (1)$$

$$R_x = \frac{R_a - (R_b \pm R_c)}{2} \quad (2)$$

wherein $R_a$ is the total resistance of detector wire 17 between points 27 and 29. $R_b$ is the resistance of detector wire 15 between points 25 and 29. $R_c$ is the resistance of the variable resistor 31. $R_x$ is the resistance of detector wire 16 between points 32 and 30. Because the resistance $R_x$ is the function of the specific resistivity of conductor 20, the distance between points 30 and 32 can immediately be determined from the value of the resistance.

In the example, a hole was placed in the cable sheath 48.2 feet from point 29 where detector wires 15 and 16 are connected. 30 ml. of water was injected into the cable through the hole which caused a short circuit in the detector circuit. Upon balancing the bridge 28, $R_c$ of the variable resistor 31 was found to be 6.74 ohm. Since the total cable length is 924 feet and the resistances for 924 feet of 19 AWG and 22 AWG conductors are 7.4 ohms and 15.6 ohms, respectively, $R_x$ is determined by Equation 2 as follows:

$$R_x=\frac{R_a-(R_b+R_c)}{2}=\frac{15.6-(7.4+6.74)}{2}=0.73 \text{ ohm}$$

The norminal specific resistivity of a 22 AWG conductor at 74° F. is 0.0167 ohm/feet. It follows that:

$$L_x=\frac{0.73}{0.0167 \text{ ohm/feet}}=43.7 \text{ feet}$$

in which $L_x$ is the distance from point 29 to the point where the short circuit occurred. After the experiment, the cable was cut open, and it was found that the water had migrated in the form of drops for 6 feet in each direction from the point of injection. The result indicates that the method is reliable within 1% of the total cable length. For best results, the resistance between the ring and tip of the perforated wires 16 and 17 should be less than about 10 megohms.

I claim:

1. A method for locating a leak in a communication cable which comprises: (1) incorporating into said cable (*a*) a first insulated electrical conductor extending longitudinally therein, (*b*) a second and (*c*) a third electrical conductor substantially parallel to said first conductor, said second and third electrical conductors normally being insulated from each other by a nonporous plastic dielectric material coated thereon to form insulation layers on the respective conductors and said insulation layers being formed with small openings spaced along its entire length capable of being short-circuited at said openings by water and other conductive materials entering into said cable, said first insulated conductor being immediately adjacent to and in contact with said second and third conductors and being twisted to form a triad of conductors; (2) electrically connecting the terminal of said first electrical conductor to the terminal of the said second conductor; (3) measuring the electrical resistance of the second conductor from between the point where the short circuit occurred to the terminal connection; and (4) determining the location where the short circuit occurred by relating said resistance to the specific resistivity of said second conductor.

2. A method for locating a leak in a communication cable which comprises: (1) incorporating into said cable (*a*) a first insulated electrical conductor extending longitudinally therein, (*b*) a second and (*c*) a third electrical conductor closely positioned with each other and substantially parallel to said first conductor, said second and third electrical conductors normally being insulated from each other by a nonporous thermoplastic dielectric material coated thereon to form insulation layers on the respective conductors and said insulation layers being formed with small openings spaced along its entire length through which the surface of the conductor is exposed and capable of being short-circuited at the openings by water and other conductive materials entering into said cable, said first insulated conductor being immediately adjacent to and in contact with said second and third conductors and being twisted to form a triad of conductors; (2) electrically connecting the terminal of said first electrical conductor to the terminal of the said second conductor; (3) measuring the electrical resistance of the second conductor from between the point where the short circuit occurred to the terminal connection by balancing the resistances of said conductors; and (4) determining the location where the short circuit occurred by relating said resistance to the specific resistivity of said second conductor.

3. A method for locating a leak in a telephone cable having an outer protective jacket and a multiplicity of conductor pairs enclosed within said jacket which comprises: (1) incorporating into said cable three twisted electrical conductors extending longitudinally therein, the first of said conductors being insulated by a nonporous plastic dielectric material and the second and third electrical conductors being insulated from each other by nonporous plastic dielectric material coated thereon forming a layer of insulation on the respective conductors and said layer of insulation having small openings substantially equally spaced along the length of the conductor through which a portion of the conductor surface is exposed, said second and third conductors capable of being short-circuited through said openings by water and other conductive materials entering into the said cable, said first insulated conductor being immediately adjacent to and in contact with said second and third conductors; (2) electrically connecting the terminal of said first electrical conductor to the terminal of the said second electrical conductor; (3) measuring the electrical resistance of the second conductor from between the point where the short circuit occurred to the terminal connection; and (4) determining the location where the short circuit occurred by relating said resistance to the specific resistivity of the second conductor.

4. An apparatus for locating a leak in a communication cable which comprises (1) three electrical conductors extending longitudinally in said cable, the first of said conductors being insulated by a nonporous plastic dielectric material and being immediately adjacent to and in contact with said second and third conductors and being twisted to form a triad of conductors and the second and third conductors being insulated from each other by nonporous plastic dielectric material coated thereon forming a layer of insulation on the respective conductors and said layers of insulation having small openings substantially equally spaced along the length of the cable through which a portion of the conductor surface is exposed, said second and third conductors capable of being short-circuited through the openings of their insulations by water and other conductive materials entering into said cable, the terminal of said first conductor being connected to the terminal of the said second conductor, (2) means for measuring the resistance of the second conductor from between the point where the short circuit occurred to the terminal connection, and (3) means for locating where the short circuit occurred by relating said resistance to the specific resistivity of said second conductor.

5. An apparatus for locating a leak in a communication cable which comprises (1) three electrical conductors extending longitudinally in said cable, the first of said conductors being insulated by a nonporous plastic dielectric material and being immediately adjacent to and in contact with said second and third conductors and being twisted to form a triad of conductors and the second and third conductors being insulated from each other by nonporous plastic dielectric material coated thereon forming a layer of insulation on the respective conductors and said layers of insulation having small openings substantially equally spaced along the length of the cable through which a portion of the conductor surface is exposed, said second and third conductors capable of being short-circuited through the openings of their insulations by water and other conductive materials entering into said cable, the first terminal of said first conductor being connected to the first terminal of said second conductor, (2) an electrical bridge circuit having its terminals connected to the second terminals opposite to said first terminals of said three conductors for measuring the resistance of the second conductor from between the point where the short circuit occurred to the terminal connection, and (3) means for locating where the short circuit occurred by relating said resistance to the specific resistivity of said second conductor.

References Cited

UNITED STATES PATENTS

| | | | |
|---|---|---|---|
| 3,098,116 | 7/1963 | Jore et al. | 174—115 |
| 3,248,646 | 4/1966 | Brazee | 324—52 |

OTHER REFERENCES

Signal Corps, U.S. Army Pamphlet, "Laying Cable in the Forward Area," released Jan. 31, 1923, pp. 16 and 17.

RUDOLPH V. ROLINEC, *Primary Examiner.*

WALTER L. CARLSON, *Examiner.*

G. R. STRECKER, *Assistant Examiner.*